(12) United States Patent
Lee

(10) Patent No.: US 7,461,184 B2
(45) Date of Patent: Dec. 2, 2008

(54) INTEGRATED CIRCUIT DEVICE HAVING TWO OR MORE INPUT PORTS AND SYSTEM FOR THE DEVICE

(75) Inventor: Dong-yang Lee, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 10/662,977

(22) Filed: Sep. 15, 2003

(65) Prior Publication Data
US 2004/0088442 A1 May 6, 2004

(30) Foreign Application Priority Data
Sep. 13, 2002 (KR) ............. 10-2002-0055682

(51) Int. Cl.
*G06F 3/00* (2006.01)
*G06F 13/28* (2006.01)
(52) U.S. Cl. ............ 710/52; 710/3; 710/5; 710/23; 710/30; 710/33; 710/36
(58) Field of Classification Search ............ 710/3, 710/5, 29, 30, 33, 36, 52
See application file for complete search history.

(56) References Cited

U.S. PATENT DOCUMENTS

| | | | | |
|---|---|---|---|---|
| 5,559,450 A | * | 9/1996 | Ngai et al. ............ 326/40 |
| 6,211,695 B1 | * | 4/2001 | Agrawal et al. ............ 326/40 |
| 6,574,688 B1 | * | 6/2003 | Dale et al. ............ 710/52 |
| 6,715,023 B1 | * | 3/2004 | Abu-Lebdeh et al. ........ 710/317 |
| 2001/0043506 A1 | * | 11/2001 | Arcoleo et al. ............ 365/233 |
| 2003/0233499 A1 | * | 12/2003 | Choi ............ 710/36 |

FOREIGN PATENT DOCUMENTS

| KR | 1995-0009077 | 3/1994 |
|---|---|---|
| KR | 1999-0172528 | 7/1997 |

OTHER PUBLICATIONS www.wikipedia.com->"natural numbers".*

* cited by examiner

*Primary Examiner*—Alan Chen
(74) *Attorney, Agent, or Firm*—F. Chau & Assoc., LLC

(57) ABSTRACT

Provided are an integrated circuit device having two or more ports and a system for the device, where the device includes a first port for inputting and outputting data and a second port for inputting the data, and either the first port and/or the second port is selected by an external command when the data is input; the second port has $\frac{1}{2^n}$ the number of pins of the first port, where n is a natural number; the device includes two or more ports that operate independently so that turn around time is reduced and the data bus efficiency of the integrated circuit device and the system are improved.

21 Claims, 7 Drawing Sheets

INTEGRATED CIRCUIT DEVICE HAVING TWO OR MORE INPUT PORTS AND SYSTEM FOR THE DEVICE

CROSS-REFERENCE TO RELATED APPLICATION

This application claims foreign priority to Korean Patent Application No. 2002-55682, filed 13 Sep. 2002 in the Korean Intellectual Property Office.

BACKGROUND OF THE INVENTION

1. Field of the Invention

The present invention relates to an integrated circuit device, and more particularly relates to an integrated circuit device having two or more input ports that are each capable of operating independently.

2. Description of Related Art

As the operating frequency of an interface of an integrated circuit device increases, especially that of a memory device, the bus efficiency relatively decreases. A typical memory device generally has an input/output port, which is used for both inputting and outputting of data. In such a typical memory device, the bus efficiency decreases as the operating frequency increases.

Although some memory devices have a separate input port and a separate output port, the input port and the output port are completely separate from each other, and thus the number of pins used increases leading to an undesirable increase in cost.

FIG. 1 is a timing diagram showing data bus efficiency of an integrated circuit device having a single input/output port, indicated generally by the reference numeral 100. The data bus efficiency shown in FIG. 1 corresponds to a case where reading and writing are repeatedly performed at a ratio of three reads to one write. Here, the clock frequency is 200 Mhz, and one clock cycle is thus 5 ns. A write recovery time ("tWR"), which denotes a time necessary for all input data to be written in a memory core, is 10 ns. The column address select ("CAS") latency ("CL") is 15 ns, and a burst length ("BL"), which denotes an index indicating the number of data units written in response to one write command, is 4.

R denotes a read command, W denotes a write command, Q denotes read data that is read out in response to the read command, D denotes written data that is written in response to the write command.

Three read commands and one write command are here regarded as one set. The number of clock cycles, from the first set when the first read data is output in accordance with three read commands and one write command, to the second set when the next read data is output in accordance with three read commands and one write command, is 14. The number of clock cycles required for the data to be written or read through the bus is 8. Therefore, the data bus efficiency is 8/14, or about 57 percent.

FIG. 2 is a timing diagram showing data bus efficiency when the integrated circuit device operates at a higher frequency than the integrated circuit device of FIG. 1, indicated generally by the reference numeral 200. Here, the clock frequency is 400 Mhz, and thus one clock cycle is 2.5 n. The CL, BL and tWR are the same as those of FIG. 1.

The number of clock cycles, from the first set when the first read data is output in accordance with three read commands and one write command, to the second set when the next read data is output in accordance with three read commands and one write command, is 19. The number of clock cycles for the data to be written or read through the bus is 8. Therefore, the data bus efficiency is 8/19, or about 42 percent.

As shown in FIGS. 1 and 2, the turn around time, which is the time required to turn from a write operation to a read operation and back again, or vice versa, increases as the operating frequency of the integrated circuit device increases, and thus the data bus efficiency decreases. Therefore, it is desirable to reduce the number of operations incurring the turn around time.

SUMMARY OF THE INVENTION

The present invention provides an integrated circuit device having two or more input ports, each of which operate independently to improve the data bus efficiency of the integrated circuit device.

According to an aspect of the present invention, there is provided an integrated circuit device including a first port for inputting and outputting data and a second port for inputting the data, wherein either or both of the first port and the second port are selected by an external command when the data are input.

The second port has $\frac{1}{2}n$ the number of pins of the first port where n is a natural number, and both the first port and/or the second port are selected by an external command when the data are input.

The integrated circuit device further comprises a control pin that receives a predetermined control signal for selecting either or both of the first port and the second port.

According to another aspect of the present invention, there is provided an integrated circuit system including a controller, and an integrated circuit device which includes a first port for inputting and outputting data and a second port for inputting the data, wherein the controller generates a command for selecting either the first port or the second port.

The second port has $\frac{1}{2}n$ the number of pins of the first port, and both the first port and the second port are selected by the command when the data are input.

The integrated circuit device further comprises a control pin that receives a predetermined control signal for selecting either or both of the first port and the second port.

According to yet another aspect of the present invention, there is provided an integrated circuit device including a first port for inputting and outputting data, a first buffering unit which is connected to the first port and buffers and stores the input or output data, a second port for inputting the data, a second buffering unit which is connected to the second port and buffers and stores the input data, and a selecting unit which selects outputs from either the first buffering unit or the second buffering unit to output in response to a selection signal, wherein, when the data are input, either the first port or the second port is selected by an external command and thus the first buffering unit and the second buffering unit are turned on by the external command.

The second port has $\frac{1}{2}n$ the number of pins of the first port. The first buffering unit includes an input/output buffer which receives the data input to or output from the first data, and an input/output register which stores the data output from the input/output buffer and outputs the stored data to the selecting unit.

The second buffering unit includes an input buffer which receives the data input from the second port, and an input register which stores the data output from the input buffer and outputs the stored data to the selecting unit.

The selection signal is generated from a command provided to the integrated circuit device. Both the first port and the second port are selected by the external command when the data are input.

The integrated circuit device further comprises a control pin that receives a predetermined control signal for selecting either or both of the first port and the second port.

According to yet another aspect of the present invention, there is provided an integrated circuit device including a first port for inputting and outputting data, an input/output buffer which receives the data input to or output from the first port, a second port for inputting the data, an input buffer which receives the data input from the second port, and a register which stores and outputs the data output from the input/output buffer and the input buffer, wherein, when the data are input, either the first port or the second port is selected by the external command and thus the first buffering unit or the second buffering unit is turned on by the external command.

The second port has ½$^n$ the number of pins of the first port, and the register selectively outputs the data output from the input/output buffer or the input buffer in response to the selection signal generated from a command provided to the integrated circuit device.

Both the first port and the second port are selected by the external command when the data are input. The integrated circuit device further comprises a control pin that receives a predetermined control signal for selecting either or both of the first port and the second port.

BRIEF DESCRIPTION OF THE DRAWINGS

The above and other features and advantages of the present invention will become more apparent by describing preferred embodiments thereof in detail with reference to the attached drawings, in which.

DETAILED DESCRIPTION OF PREFERRED EMBODIMENTS

The present invention now will be described more fully with reference to the accompanying drawings, in which preferred embodiments of the invention are shown.

Figure 3:
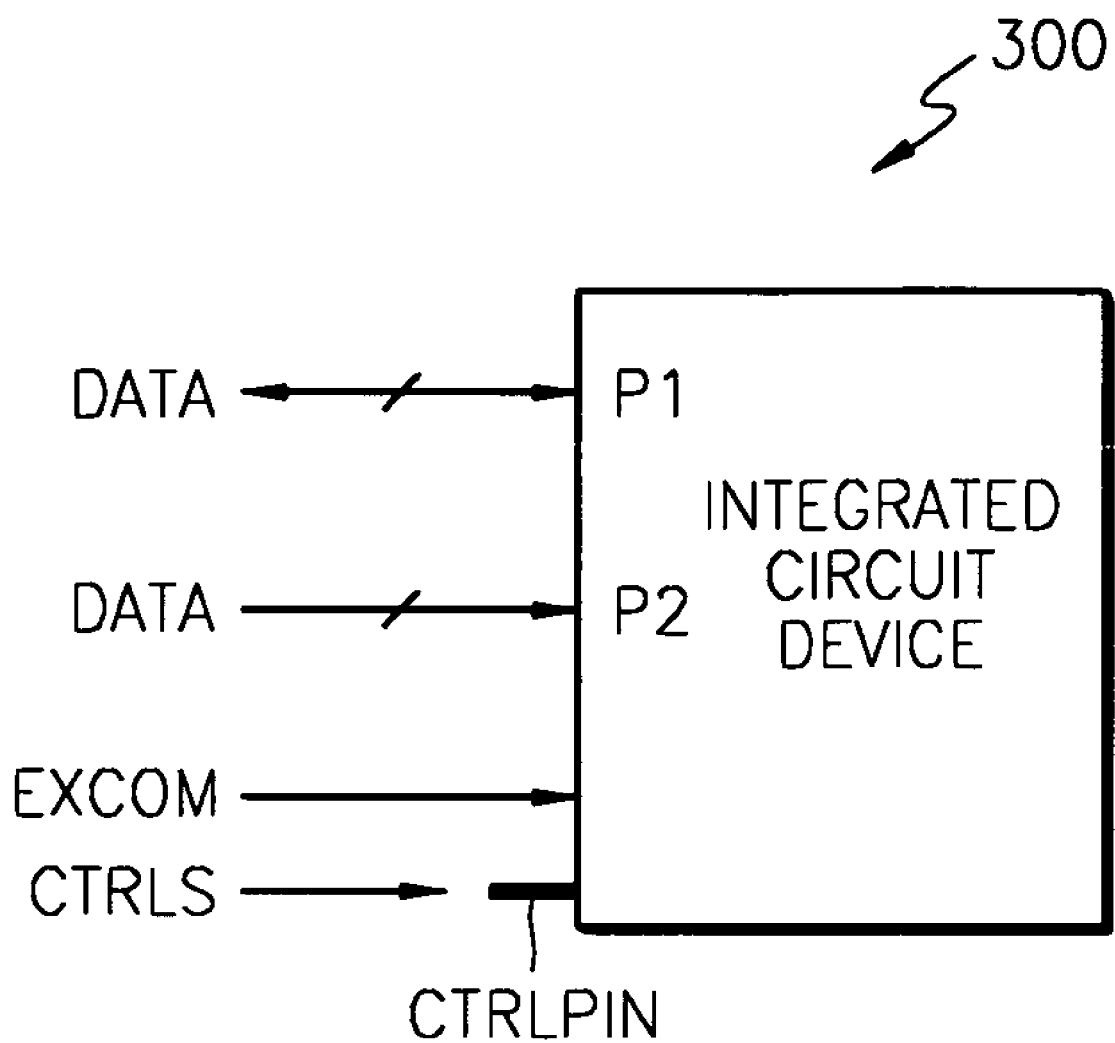
FIG. 3 is a view of an integrated circuit device according to a first embodiment of the present invention.

FIG. 3 is a block diagram of an integrated circuit device according to a first embodiment of the present invention, indicated generally by the reference numeral 300.

Referring to FIG. 3, an integrated circuit device 300 includes a first port P1 for inputting and outputting data DATA and a second port P2 for inputting data DATA.

When data DATA is written and read through only the first port P1, which is used for both inputting and outputting, a turn around time, which is the time required to turn from the write operation to the read operation and vice versa, inevitably results, and thus the data bus efficiency is decreased.

The second port P2, which is exclusively used for inputting the data DATA, is added to the integrated circuit device 300. The second port P2 includes ½$^n$ of the number of pins of the first port P1, where n is a natural number. In practice, n may be selected in accordance with the projected usage of the integrated circuit and/or design criteria. That is, the number of pins of the second port P2 may be ½, ¼, and ⅛, and so on of the number of pins of the first port P1.

Here, the second port P2 has fewer pins than the first port P1 because there are generally less write operations than read operations among operations of the integrated circuit device 300.

For example, if the second port P2 has half the number of pins of the first port P1, and the number of write operations of the integrated circuit device 300 is still less than the number of read operations, the second port P2 might be used only for write operations and the first port P1 might be used only for read operations, thereby increasing the data bus efficiency.

When data DATA is input, either the first port P1 or the second port P2 is selected by an external command EXCOM. That is, the second port P2 may be selected by the external command EXCOM for writing the data DATA and the first port P1 may be selected for only reading the DATA by the external command EXCOM. Here, the external command EXCOM may be generated by a controller.

If, for example, the second port P2 has one-fourth the number of pins of the first port P1 and the number of write operations is greater than the number of read operations by 25 percent, it is undesirable to perform write operations by using only the second port P2. However, this can be solved by using the first port P1 for write operations as well as read operations, in which case both the first port P1 and the second port P2 can be selected for writing by the external command EXCOM.

Instead of using the external command EXCOM for selecting the first port P1 or the second port P2, the integrated circuit device 300 may use a control pin CTRLPIN which receives a predetermined control signal CTRLS for selecting the first port P1 and/or the second port P2 when the data DATA is input.

For example, if the control signal CTRLS at a high level is input to the control pin CTRLPIN, the data DATA may be written by using the first port P1, and if the control signal CTRLS at a low level is input to the control pin CTRLPIN, the data DATA may be written by using the second port P2.

Figure 4:
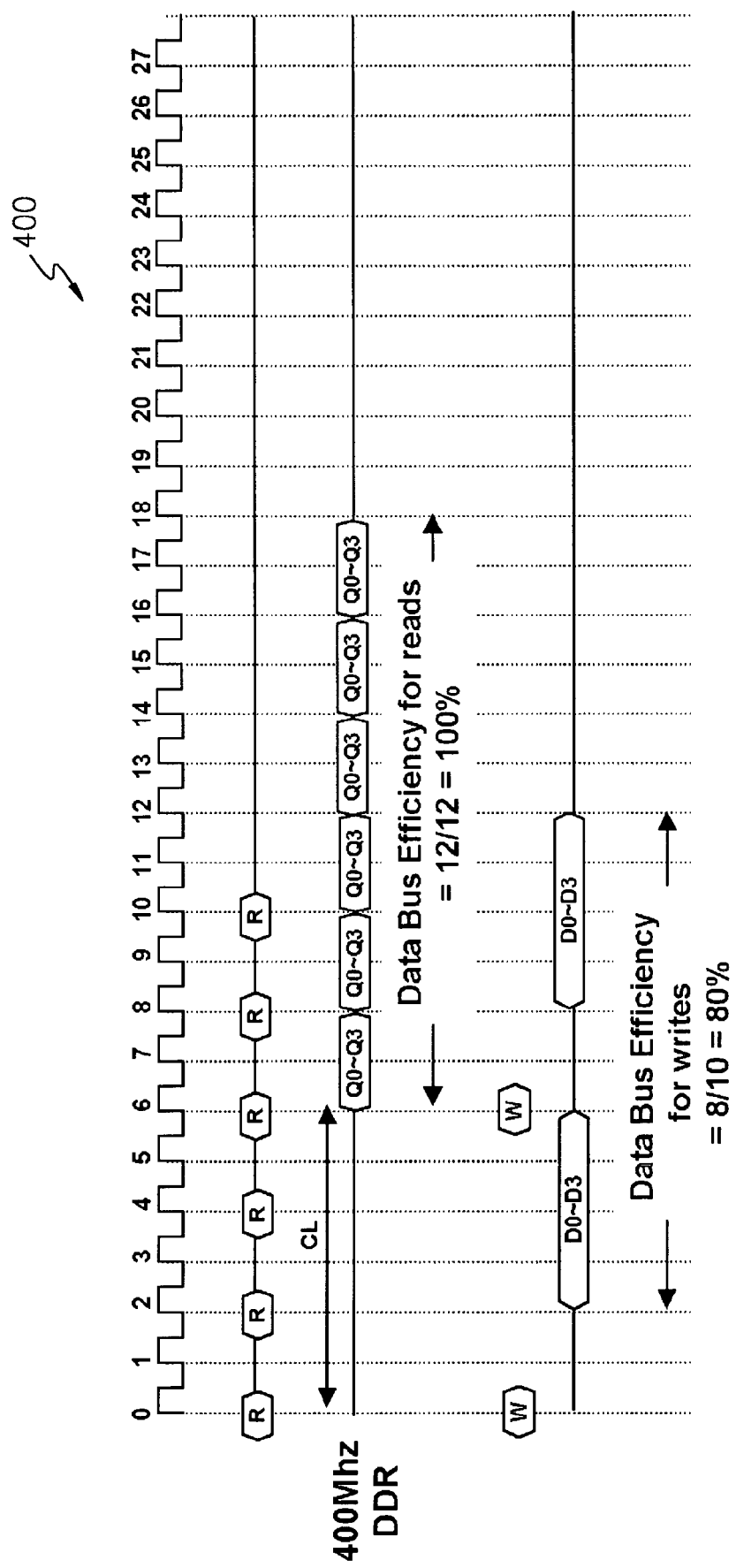
FIG. 4 is a timing diagram showing data bus efficiency of the integrated circuit device of FIG. 3.

FIG. 4 is a timing diagram showing data bus efficiency of the integrated circuit device of FIG. 3, indicated generally by the reference numeral 400.

FIG. 4 shows the case when the read operations and write operations are repeated in a ratio of three to one and the second port P2 has half the number of pins of the first port P1. Here, the clock frequency is 400 Mhz, and one clock cycle is 2.5 n. The tWR is 10 ns, the CL is 15 ns, and the BL is 4 for the write operations and 4 for the read operations.

In the read operations, the number of clock cycles for the data to be read is 12, and the number of clock cycles for the data DATA to be read through the bus is 12, and thus the data bus efficiency is 12/12 or 100 percent.

In the write operations, the number of clock cycles for all data DATA to be written is 10, and the number of clock cycles for the data DATA to be written through the bus is 8, and thus the data bus efficiency is 8/10 or 80 percent.

Figure 1:
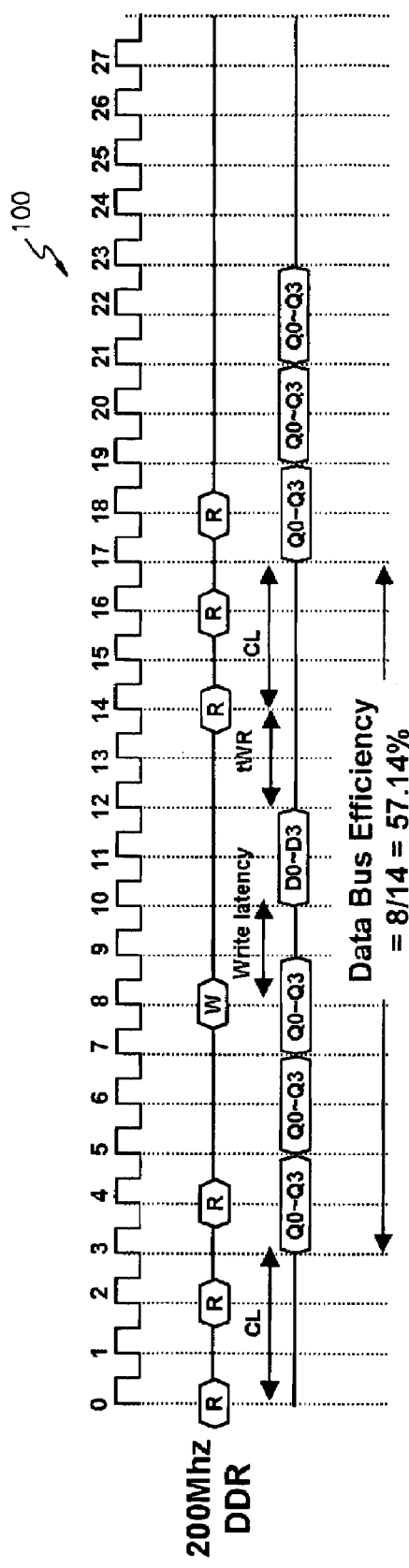
FIG. 1 is a timing diagram showing a data bus efficiency of a typical integrated circuit device having an input/output port which is used for both inputting and outputting.
Figure 2:
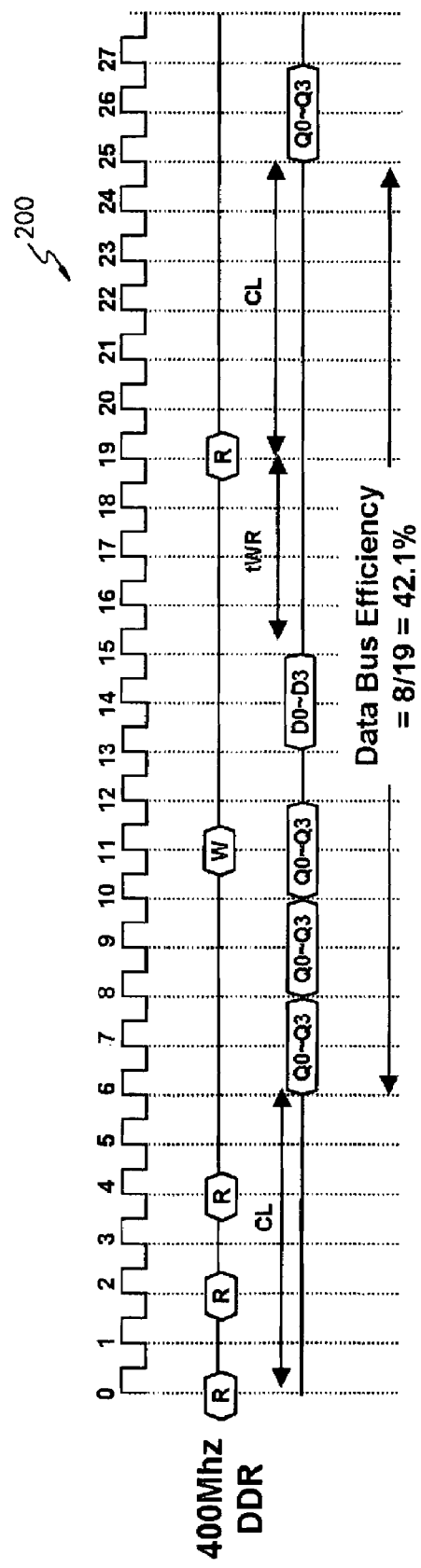
FIG. 2 is a timing diagram showing a data bus efficiency of a typical integrated circuit device when the integrated circuit device operates at a higher frequency than the integrated circuit device of FIG. 1.

Thus, the data bus efficiency according to the integrated circuit device 300 of the present invention shown in FIG. 4 is improved over those of FIGS. 1 and 2.

Figure 5:
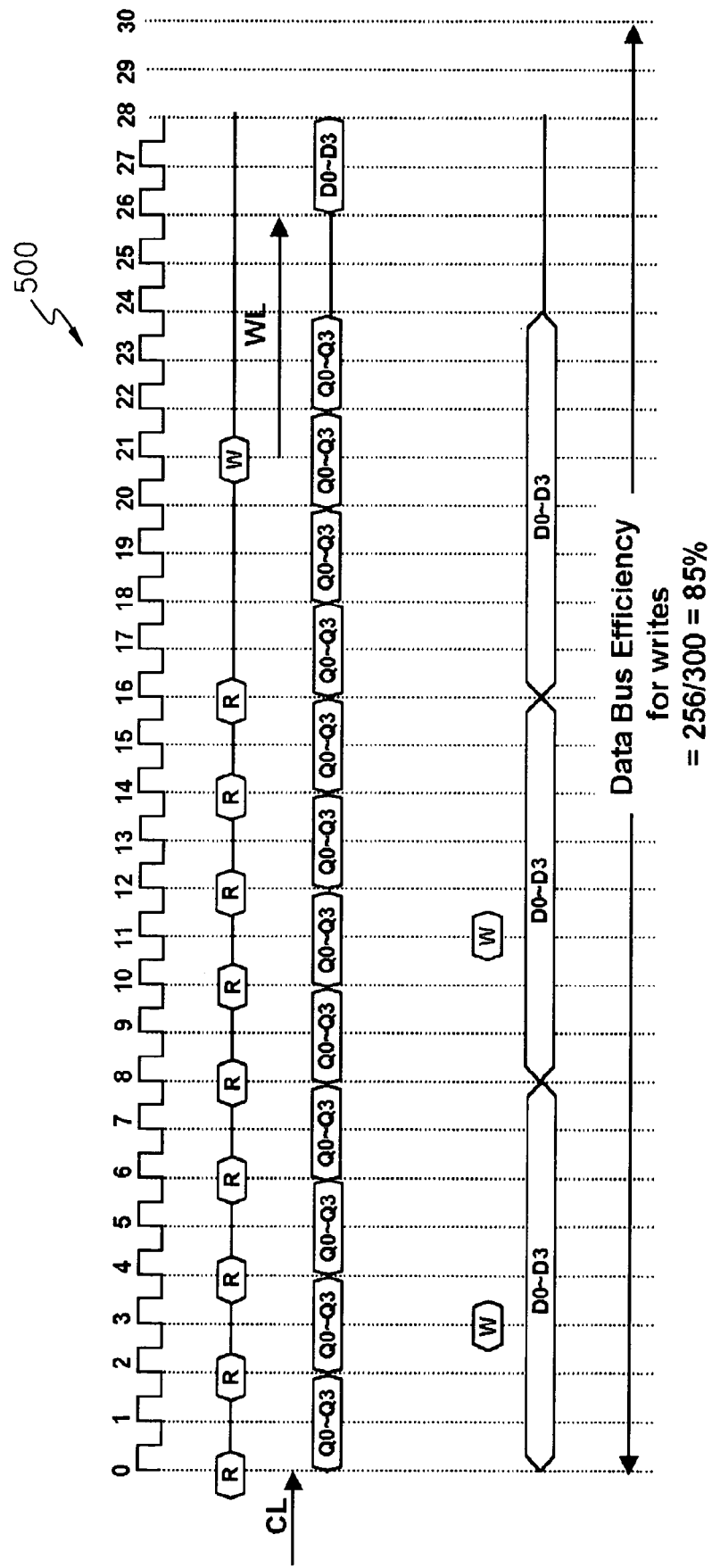
FIG. 5 is another timing diagram showing the data bus efficiency of the integrated circuit device of FIG. 3.

FIG. 5 is another timing diagram showing the data bus efficiency of the integrated circuit device of FIG. 3, indicated generally by the reference numeral 500.

FIG. 5 shows the case when the write operations and the read operations are repeated in a ratio of three to one and the second port P2 has one-fourth the number of pins of the first port P1. Here, the clock frequency is 400 Mhz, and one clock cycle is 2.5 ns. The tWR is 5 ns, and the BL is 4 for the write operations and 4 for the read operations.

Since the second port P2 has one-fourth the number of pins of the first port P1 and the write operations take up 25 percent of the total read and write operations, it is undesirable to perform all write operations through only the second port P2, and thus the first port P1 performs both write and read operations.

Nine read commands and three write commands span 30 clock cycles. In FIG. 5, the last input data is written by the last write command coinciding with the $28_{th}$ clock cycle. However, read data of the next set begins at a $30_{th}$ clock cycle. Therefore, one set of nine read commands and three write commands lasts 30 clock cycles.

If the total number of pins is 5, then the first port P1 has 4 pins and the second port P2 has 1 pin, because the second port P2 has one-fourth the number of pins of the first port P1. Therefore, the total number of clock cycles is 300, which is calculated by multiplying 5 (the total number of pins) by 30 (the total number of clock cycles for one set) by 2 (when the integrated circuit device is a double data rate RAM).

The number of clock cycles used for the read operations is 208, which is calculated by multiplying 4 (the number of pins of the first port P1) by 30 (the number of clock cycles used for the read operations) by 2 (when the integrated circuit device is a double data rate RAM).

The number of clock cycles used for the write operations is 48, which is calculated by multiplying 1 (the number of pins of the second port P2) by 24 (the number of clock cycles used for the write operations) by 2 (when the integrated circuit device is a double data rate RAM).

Therefore, the number of clock cycles used for the read and the write operations is 256, and thus the data bus efficiency is 256/300 or 85 percent.

The data bus efficiency according to the integrated circuit device 300 of the present invention shown in FIG. 5 is improved over those of FIGS. 1 and 2.

Figure 6:
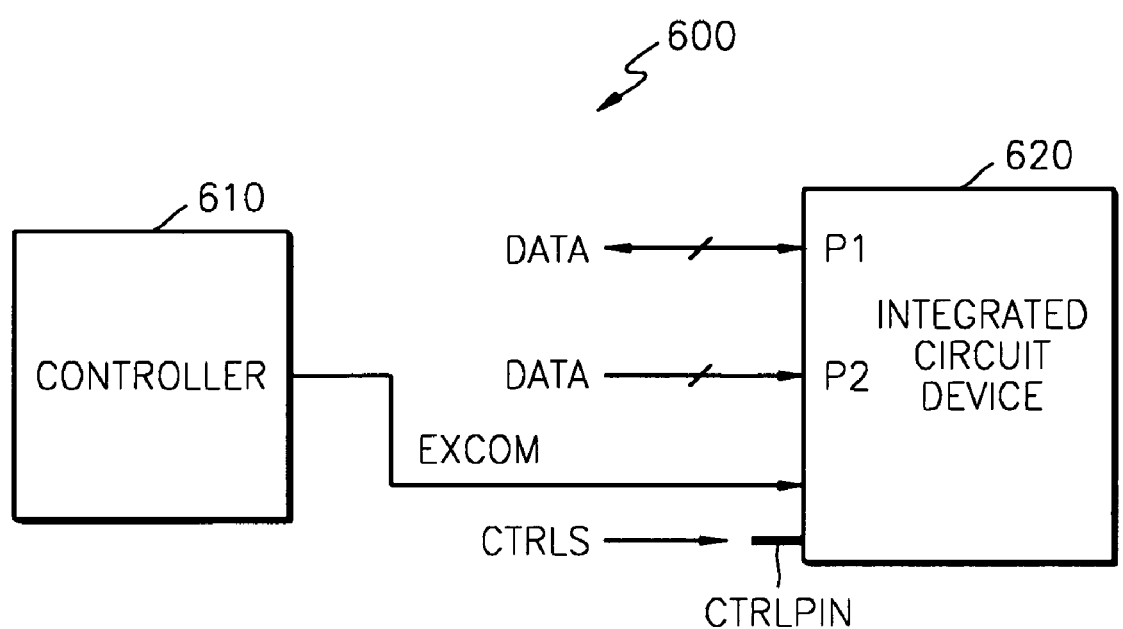
FIG. 6 is a block diagram of the integrated circuit system according to a second embodiment of the present invention.

FIG. 6 is a block diagram of the integrated circuit system according to a second embodiment of the present invention, indicated generally by the reference numeral 600.

Referring to FIG. 6, an integrated circuit system 600 according to a second embodiment of the present invention includes a controller 610 and an integrated circuit device 620. The integrated circuit device 620 includes a first port P1 for inputting and outputting data DATA and a second port P2 for inputting the data DATA.

The integrated circuit device 620 is otherwise the same as the integrated circuit device 300 of FIG. 3. Therefore, a detailed description of the integrated circuit device 620 will not be repeated here. The controller 610 generates a command EXCOM for selecting either the first port P1 and/or the second port P2. Here, the command EXCOM is the same as the external command EXCOM of FIG. 3. The integrated circuit system 600 of FIG. 6 includes the controller 610 that generates the command EXCOM for selecting the integrated circuit device 300 and the first port P1 and/or the second port P2.

The controller 610 may generate the command EXCOM for selecting only the second port P2, thereby performing write operations when the number of write operations is considerably smaller than the number of read operations, or may generate the command EXCOM for selecting both the first port P1 and the second port P2, thereby performing write operations when it would be less efficient to perform the write operations using only the second port P2.

Figure 7:
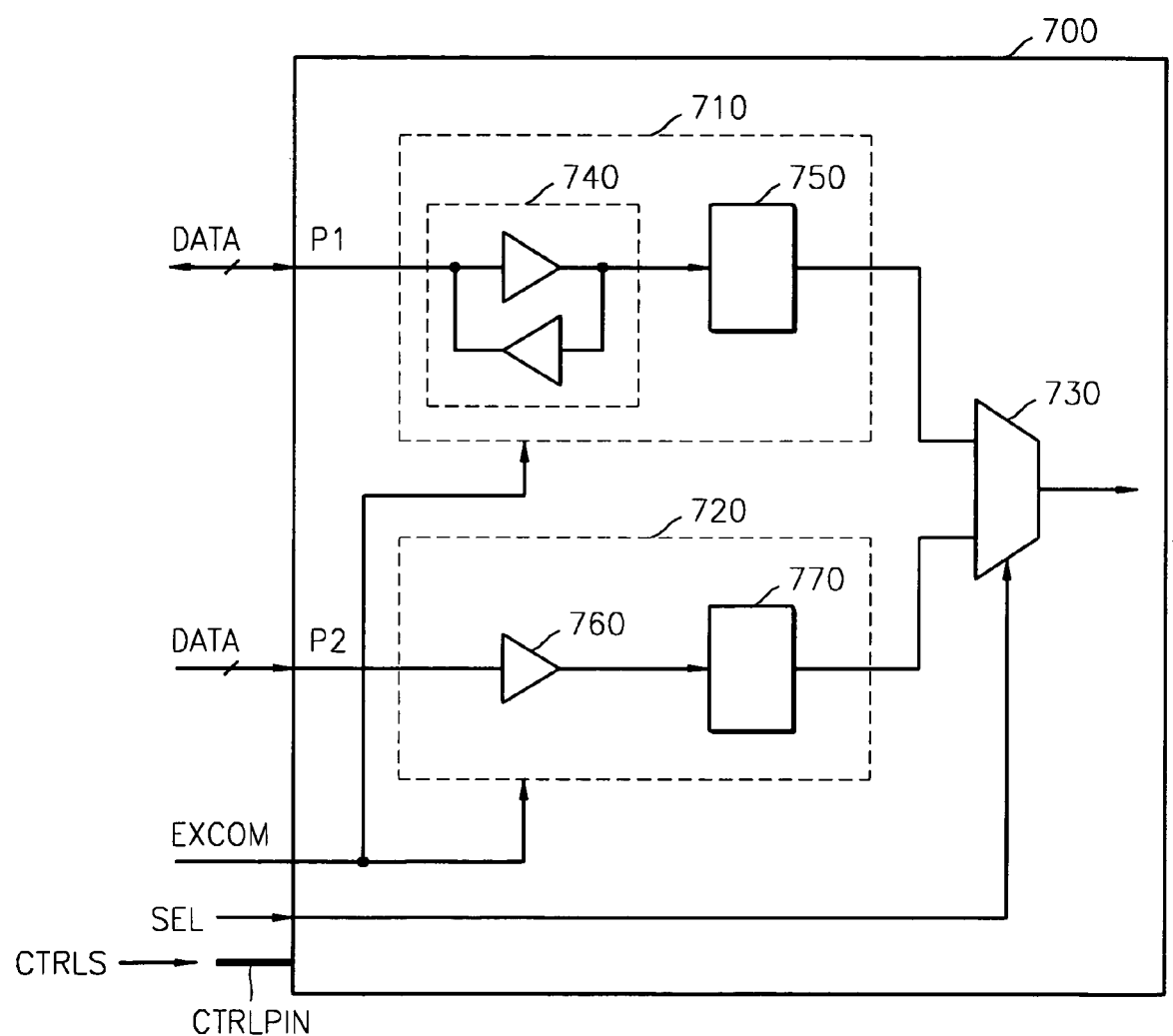
FIG. 7 is a block diagram showing the inside of the integrated circuit device according to a third embodiment of the present invention.

FIG. 7 is a block diagram showing the inside of an integrated circuit device according to a third embodiment of the present invention, indicated generally by the reference numeral 700.

An integrated circuit device 700 according to the third embodiment of the present invention includes a first port P1 which inputs and outputs the data DATA, a first buffering unit 710 which is connected to the first port P1 and buffers and stores the data DATA input or output by the first port P1, a second port P2 which inputs the data DATA, a second buffering unit 720 which is connected to the second port P2 and buffers and stores the data DATA input by the second port P1, and a selecting unit 730 which selects outputs from either the first buffering unit 710 or the second buffering unit 720 in response to a selection signal SEL.

When the data DATA is input, either the first port P1 and/or the second port P2 is selected by the external command EXCOM, and the first buffering unit 710 and/or the second buffering unit 720 are turned on by the external command EXCOM.

The second port P2 has $½^n$ the number of pins of the first port P1. The first buffering unit 710 includes an input/output buffer 740 which receives data DATA input to or output from the first port P1 and an input/output register 750 which stores the data DATA output from the input/output buffer 740 and outputs the stored data to the selecting unit 730.

The second buffering unit 720 includes an input buffer 760 which receives the data DATA input from the second port P2 and an input register 770 which stores the data DATA output from the input buffer 760 and outputs the stored data to the selecting unit 730.

The selection signal SEL is generated by a command provided to the integrated circuit device 700. In the integrated circuit device 700, both the first port P1 and the second port P2 may be selected by the external command EXCOM when the data DATA is input.

The integrated circuit device 700 may include a control pin CTRLPIN which receives a predetermined control signal CTRLS for selecting the first port P1 and/or the second port P2.

The first port P1 can be used for both the write operations and the read operations, while the second port P2 is used for only the write operations. The external command EXCOM selects which of the first port P1 and the second port P2 will be used for write operations.

If the second port P2 is selected by the external command EXCOM, the second port P2 is turned on by the external command EXCOM. Then, the input data DATA is stored in the input register 770 through the input buffer 760. If the first port P1 is selected by the external command EXCOM, the first buffering unit 710 is turned on by the external command EXCOM. Then, the input data DATA is stored in the input/output register 750 through the input/output buffer 740.

In response to the selection signal SEL, the selecting unit 730 selects and outputs data DATA, which are stored in the input/output register 750 or the input, register 770. The selection signal SEL may be a command that is provided to the integrated circuit device 700 or may be a combination of a plurality of commands. The second port P2 is used exclusively for write operations to thereby enhance the data bus efficiency.

Figure 8:
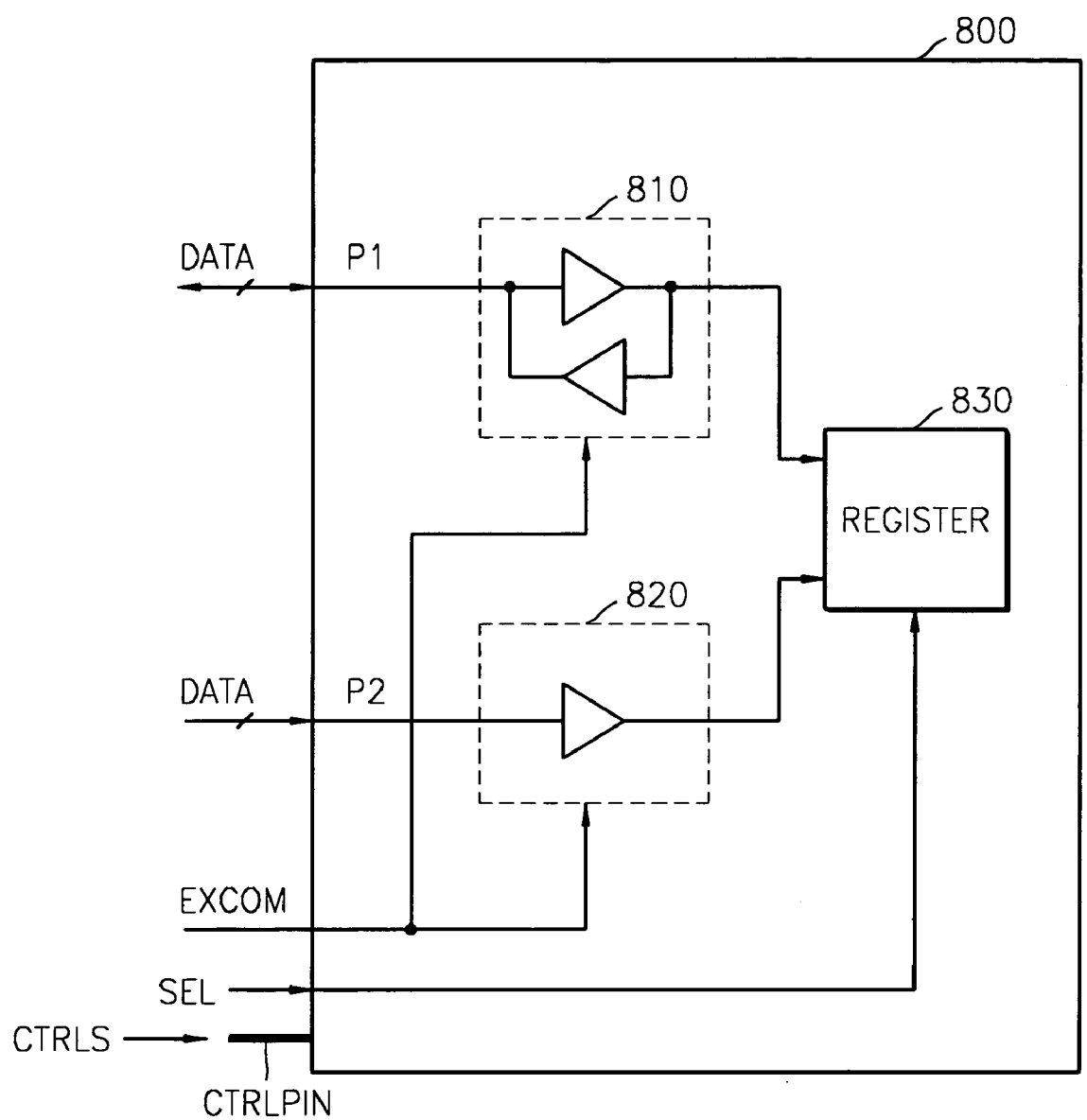
FIG. 8 is a block diagram showing the inside of the integrated circuit device according to a fourth embodiment of the present invention.

FIG. 8 is a block diagram showing the inside of an integrated circuit device according to a fourth embodiment of the present invention, indicated generally by the reference numeral 800.

An integrated circuit device 800 includes a first port P1 which inputs and outputs the data DATA, an input/output buffer 810 which receives the data DATA input to or output from the first port P1, a second port P2 which inputs the data DATA, an input buffer 820 which receives the data DATA input from the second port P2, and a register 830 which stores and outputs the data DATA output from the input/output buffer 810 and the input buffer 820.

When the data DATA is input, either the first port P1 or the second port P2 is selected by the external command EXCOM, and the input/output buffer 810 or the input buffer 820 is turned on by the external command EXCOM.

The second port P2 has $\frac{1}{2^n}$ the number of pins of the first port P1. In response to the selection signal SEL generated from a command applied to the integrated circuit device 800, the register 830 selectively outputs the data output from the input/output buffer 810 or the output buffer 820.

In the integrated circuit device 800, both the first port P1 and the second port P2 can be selected by the external command EXCOM when the data DATA is input. The integrated circuit device 800 can include a control pin CTRLPIN which receives a predetermined control signal CTRLS for selecting the first port P1 and/or the second port P2 in inputting data DATA.

Unlike the integrated circuit device 700 of FIG. 7, in the integrated circuit device 800 of FIG. 8 both the data input to the first port P1 and the data DATA input to the second port P2 are stored in the register 830. Therefore, an additional register is not included inside the first buffering unit 810 or the second buffering unit 820. The data DATA stored in the register 830 are sequentially output. However, it is also possible to selectively output the stored data by using the selection signal SEL. The selection signal SEL may be a command that is provided to the integrated circuit device 800 or may be a combination of a plurality of commands. There are no substantial differences between the integrated circuit devices 700 and 800 other than those described above, and thus detailed description of the duplicated portions of the integrated circuit device 800 is omitted.

As described above, the integrated circuit device and a system for the device includes two or more input ports that operate independently so that unnecessary time consumption for a turn around time can be reduced. A turn around time is the time required to turn from a write operation to a read operation and/or vice versa. Thus, a reduction in the frequency of occurrence of turn-arounds incurs less turn around time such that the data bus efficiency of the integrated circuit device and the system can be improved.

While this invention has been particularly shown and described with reference to preferred embodiments thereof, it will be understood by those of ordinary skill in the pertinent art that various changes in form and details may be made therein without departing from the spirit and scope of the invention as defined by the appended claims and equivalents.

What is claimed is:

1. A monolithic integrated circuit device comprising:
   a first port for inputting write data directly from the outside of the device and outputting read data directly to the outside of the device and having connected thereto a first buffering unit for buffering and storing the input write data or the output read data;
   a second port for only inputting write data directly from the outside of the device and having connected thereto a second buffering unit for buffering and storing the input write data; and
   a selecting unit whereby at least one of the first port and the second port is selected by an external command when the write data is input and at least one of the first and second buffering units is turned on by the external command.

2. The monolithic integrated circuit device of claim 1 wherein the second port has $\frac{1}{2^n}$ times the number of pins of the first port, where n is a positive integer.

3. The monolithic integrated circuit device of claim 1 wherein both the first port and the second port are selected by the external command when the write data is input.

4. The monolithic integrated circuit device of claim 1, further comprising a control pin for receiving a predetermined control signal to select at least one of the first port and the second port.

5. An integrated circuit system comprising:
   a monolithic integrated circuit device that includes a first port for inputting write data directly from the outside of the system and outputting read data directly to the outside of the system and having connected thereto a first buffering unit for buffering and storing the input write data or the output read data and a second port for only inputting write data directly from the outside of the system an having connected thereto a second buffering unit for buffering and storing the input write data; and
   a controller for generating a command to cause a selecting unit to select either the first port or the second port and wherein at least one of the first and second buffering units is turned on by the command.

6. The integrated circuit system of claim 5 wherein the second port has $\frac{1}{2^n}$ times the number of pins of the first port, where n is a positive integer.

7. The integrated circuit device of claim 5 wherein both the first port and the second port are selected by the command when the write data are input.

8. The integrated circuit device of claim 5 wherein the integrated circuit device further comprises a control pin that receives a predetermined control signal for selecting either or both of the first port and the second port.

9. A monolithic integrated circuit device comprising:
   a first port for inputting write data directly from the outside of the device and outputting read data directly to the outside of the device;
   a first buffering unit in signal communication with the first port for buffering and storing the input write data or output read data;
   a second port for only inputting write data directly from the outside of the device;
   a second buffering unit in signal communication with the second port for buffering and storing the input write data; and
   a selecting unit for selecting outputs from at least one of the first buffering unit and the second buffering unit to output in response to a selection signal, wherein at last one of the first port and the second port is selected by an external command when the write data is input and at least one of the first buffering unit and the second buffering unit is turned on by the external command.

10. The integrated circuit device of Claim 9 wherein the second port has $\frac{1}{2}^n$ times the number of pins of the first port, where n is a positive integer.

11. The integrated circuit device of claim 9 wherein the first buffering unit comprises:
an input/output buffer for receiving the write/read data input to or output from the first port, respectively; and
an input/output register for storing the write/read data output from the input/output buffer, respectively, and outputting the stored write/read data to the selecting unit.

12. The integrated circuit device of claim 9 wherein the second buffering unit comprises:
an input buffer for receiving the write data input from the second port; and
an input register for storing the write data from the input buffer and outputting the stored data to the selecting unit.

13. The integrated circuit device of claim 9 wherein the selection signal is generated from a command provided to the integrated circuit device.

14. The integrated circuit device of claim 9 wherein both the first port and the second port are selected by the external command when the write data are input.

15. The integrated circuit device of claim 9, further comprising a control pin for receiving a predetermined control signal to select at least one of the first port and the second port.

16. A monolithic integrated circuit device comprising:
a first port for inputting write data directly from the outside of the device and outputting read data directly to the outside of the device;
an input/output buffer for receiving the write data input to or read data output from the first port;
a second port for only inputting write data directly from the outside of the device;
an input buffer for receiving the write data input from the second port; and
a register for storing and outputting the write/read data from the input/output buffer, respectively, and from the input buffer wherein at least one of the first port and the second port is selected by an external command when the write data is input and at least one of the input/output buffer and the input buffer is turned on by the external command.

17. The integrated circuit device of claim 16 wherein the second port has $\frac{1}{2}^n$ times the number of pins of the first port, where n is a positive integer.

18. The integrated circuit device of claim 16 wherein the register selectively outputs the write/read data output from the input/output buffer, respectively, or from the input buffer in response to the selection signal generated from a command provided to the integrated circuit device.

19. The integrated circuit device of claim 16 wherein both the first port and the second port are selected by the external command when the write data are input.

20. The integrated circuit device of claim 16 wherein the integrated circuit device further comprises a control pin for receiving a predetermined control signal to select at least one of the first port and the second port.

21. An integrated circuit device comprising:
a first port for inputting write data and outputting read data; and
a second port for only inputting write data,
wherein at least one of the first port and the second port is selected by an external command when the write data is input, and wherein the second port has $\frac{1}{2}^n$ times the number of pins of the first port, where n is a positive integer of at least 2.

* * * * *